June 30, 1953  L. A. MEDLAR  2,644,125
APPARATUS FOR CHARGING BATTERIES
Filed Nov. 3, 1949  3 Sheets-Sheet 1
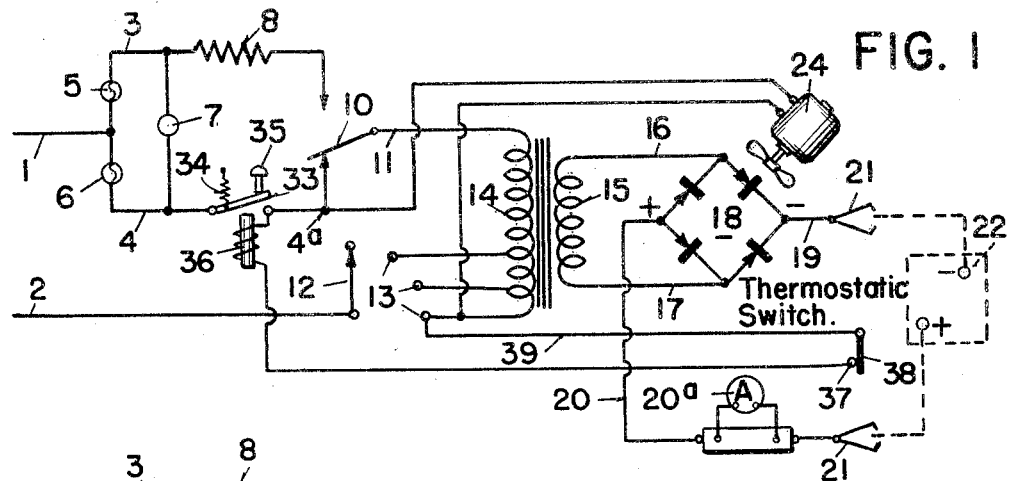
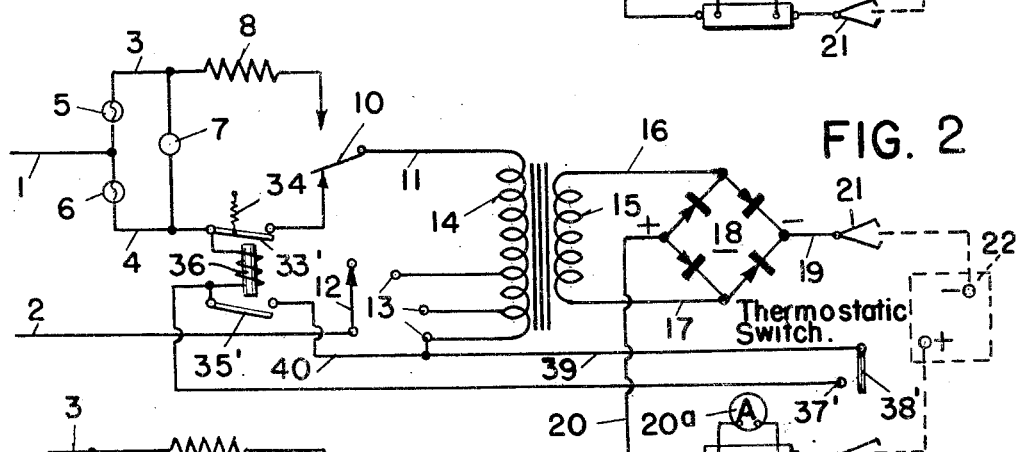
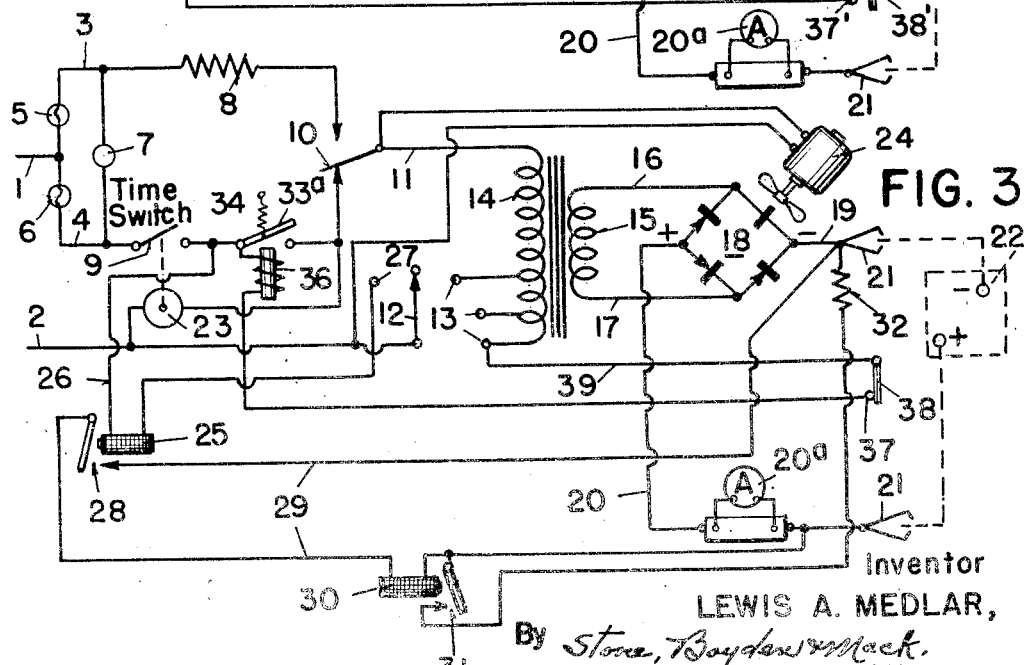
Inventor
LEWIS A. MEDLAR,
By Stone, Boyden & Mack.
Attorneys.

Inventor
LEWIS A. MEDLAR,
By Stone, Boyden & Mack,
Attorneys.

June 30, 1953 — L. A. MEDLAR — 2,644,125
APPARATUS FOR CHARGING BATTERIES
Filed Nov. 3, 1949 — 3 Sheets-Sheet 3

Inventor
LEWIS A. MEDLAR,
By Stone, Boyden & Mack,
Attorneys.

Patented June 30, 1953

2,644,125

UNITED STATES PATENT OFFICE 2,644,125

APPARATUS FOR CHARGING BATTERIES

Lewis A. Medlar, Oreland, Pa., assignor, by mesne assignments, to Fox Products Company, Philadelphia, Pa., a corporation of Pennsylvania Application November 3, 1949, Serial No. 125,324

3 Claims. (Cl. 320—22)

This invention relates to charging apparatus for storage batteries, and more particularly to an arrangement for fast charging, slow charging and testing such batteries.

The present invention is generally similar to that covered by my prior Patent No. 2,456,978, issued December 21, 1948, but incorporates many novel and important features not embodied in said patent.

Like said patent, the present invention comprises an input circuit having relatively low resistance and high resistance branches connecting the power leads to the transformer primary for fast and slow charging, respectively, together with manual means for selecting the particular branch which it is desired to use. The patented arrangement, however, employs a time-controlled switch in the low resistance or fast charging branch, while in the present invention I employ in this branch a thermally controlled switch, either in place of or in addition to the time-controlled switch.

Where a thermally controlled switch alone is used, and arranged to cut off upon the attainment by the battery of a predetermined maximum temperature, the circuit must be so designed that current will not be turned on again when the battery cools down. An object of the present invention is the provision of improved "lock-out" means for accomplishing this.

While, in said patent, the manual selector switch was connected with the primary of the transformer, I now find it desirable under some conditions, to connect such selector switch directly to one of the power leads, and the present invention contemplates connecting it in either way.

Where a time-controlled switch and thermally controlled switch are both employed, they are arranged in series, and the time controlled switch is driven by an electric powered motor. An object of the invention is to so connect this motor to the power leads that it is energized only when both switches are closed.

As in said patent, I employ in the present arrangement a motor-driven fan for cooling the rectifier. Another object of the invention is to provide means whereby this fan is operated during both fast and slow charging, but at lower speed during slow charging.

A practical difficulty which has been encountered in connection with the operation of battery chargers of this general type is that the operator will frequently, through carelessness or inattention, connect the battery to the charger in reverse. Or the connections to the battery may contain a short circuit. In either case a heavy current is drawn from the line, even with the slow charge connection, and the resistor in this connection is damaged or burned out. To protect the charger from this danger, I employ a pair of automatic circuit breakers, one in each branch of the input circuit, and to indicate to the operator when either of these breakers opens, I provide a visual signal such as a lamp. A further and important object of the invention is to devise an arrangement by which a single signal lamp is employed and connected with the circuit breakers in such manner that it is actuated by the opening of either breaker. Thus the actuation of this signal lamp serves to indicate to the operator either that the battery has been connected in reverse, or that a short circuit exists.

A still further object of the invention is to so connect the cooling fan that its operation is not interrupted by the opening of the circuit breakers. Otherwise, if the battery were connected in reverse, and the operator failed to notice that condition or the indication given by the signal lamp, the battery would continue to discharge through the rectifier, thus causing it to heat up rapidly, with resulting damage. If, however, the fan is so arranged that it continues to run, even though the circuit breakers are open, it protects the rectifier from overheating.

With the above and other objects in view and to improve generally on the details of apparatus of this character, the invention consists in the construction and arrangement of parts hereinafter described and claimed, and illustrated in the accompanying drawings, forming part of this specification, in which—

Fig. 1 is a diagram illustrating my improved battery charging apparatus and showing one form of thermally controlled switch;

Fig. 2 is a similar view showing a slightly different form of thermally controlled switch;

Fig. 3 is a diagram showing my improved battery charging apparatus equipped with both a time-controlled switch and thermally controlled switch, and also showing means for testing the battery;

Figure 4:
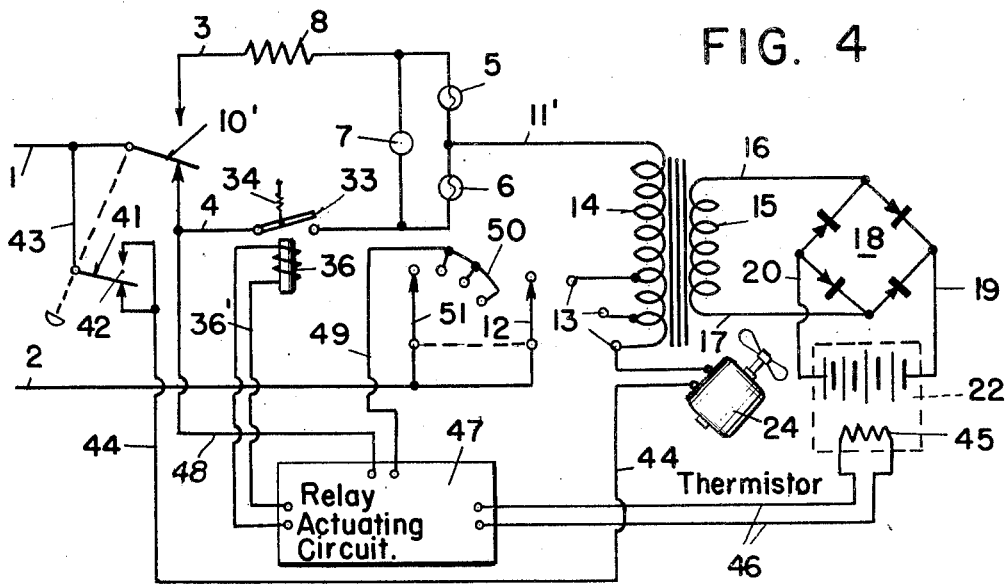
Fig. 4 is a diagram illustrating another arrangement of my improved battery charging apparatus in which the selector switch is connected to the power lead instead of to the transformer primary as in the preceding figures, and also in which a thermistor and special actuating circuit is employed instead of the thermostat illustrated in the preceding figures.

Referring to the drawings in detail and more particularly first to Fig. 1, 1 and 2 designate alternating current power leads to which my improved battery charging apparatus is connected. As in my above identified patent, the input circuit consists of two branches 3 and 4 to which the power lead 1 is connected, the branch 3 containing a resistor 8 and being used for slow charging. The branch 4, employed for fast charging contains, in the present embodiment, a thermally controlled switch 33 hereinafter more particularly described.

Included in each branch 3 and 4 is an automatic circuit breaker, the breaker in branch 3 being designated 5 and the breaker in the branch 4 being designated 6. The terminals at one side of the two circuit breakers are connected together and to the power lead 1, while connected across the other two terminals of the circuit breakers is a signal lamp 7.

At the end of the branches 3 and 4, remote from the power lead 1, is a selector switch 10 adapted to selectively engage either branch, this selector switch being connected by conductor 11 with the primary 14 of the usual transformer, as in said prior patent. In the present case, however, I prefer to place the tap switch 12 and transformer taps 13 at the opposite end of the primary winding 14.

Because of the selector switch 10, it is obvious that only one of the two circuit breakers 5 and 6 can be included in the input circuit at any given time. Thus when the selector switch 10 is in the position shown in Fig. 1 in which it engages the branch 4, the circuit breaker 6 is in circuit while the breaker 5 is idle.

Assuming the switch 33 to be closed, and both breakers in normal position, the signal lamp 7 is short circuited by the breaker 6 and hence receives no current. If, however, the breaker 6 should open then lamp 7 will be energized by current flowing up through breaker 5, and thus caused to glow.

If, on the other hand, selector switch 10 is in engagement with branch 3, for slow charging and if for any reason circuit breaker 5 opens then the lamp 7 will be energized by current flowing down through breaker 6 and out through resistor 8 and switch 10, and thus caused to glow. Hence it will be seen that the signal lamp 7 is energized or actuated upon the opening of either circuit breaker 5 or 6. The opening of these circuit breakers and the energization of the signal lamp 7 as described serves to indicate to the operator either that the battery is connected in reverse or that there is a short circuit in the battery connections.

The secondary 15 of the transformer is shown as connected by wires 16 and 17 to a rectifier 18 of any suitable type such as an air cooled dry disc rectifier. From this rectifier extend conductors 19 and 20 connected at their ends with battery clamps 21, adapted to be attached to the terminals of the battery 22 to be charged, as in my prior above identified patent. An ammeter 20a is preferably included in the conductor 20.

As in said patent, a fan, driven by a motor 24, is employed to cool the rectifier and this motor is connected across the transformer primary, tapping the branch 4 of the input circuit at the point 4a.

The thermally controlled switch 33, included in the fast charging branch 4 of the input circuit is normally open, being biased to open position by a spring 34. It may be manually closed by means of a push button 35.

This switch is operated by a relay 36 controlled by a thermostatic switch comprising a contact 37 and a bi-metallic element 38. One side of the relay winding 36 is connected with the branch 4 at a point beyond the switch 33 and the other side of this relay winding is connected with contact 37. The bi-metallic element 38 is connected by wire 39 with the transformer primary adjacent the tap switch.

The operation of this modification of the invention is as follows. Normally, when the battery is cold, the thermostatic switch is closed as shown. This does not energize the relay 36, however, because the circuit is broken at the normally open switch 33. Assuming the selector switch 10 to be in the position illustrated in Fig. 1, when the operator desires to commence charging, he depresses the button 35 causing the switch 33 to complete the input circuit. The closing of switch 33 also serves to energize the relay 36 so that this relay holds the switch 33 closed after the push button 35 is released. Charging then proceeds and when the battery attains a predetermined maximum temperature the thermostatic switch 37, 38 opens, thus deenergizing the relay 36 and permitting the spring 34 to open the switch 33, thus interrupting the input or charging circuit.

If the battery is allowed to remain in position, when it cools off the thermostatic switch will close again. But such closing will not serve to energize the relay 36 and again complete the charging circuit. When the relay is deenergized and the switch 33 opens, it therefore remains open until again closed manually. It is not desirable to have the charging current turned on automatically when the battery cools off, and hence the provision of the above described circuit and relay which may be designated a "lock-out" arrangement.

It will be observed that in the arrangement shown in Fig. 1 the fan motor is so connected as to run only when the fast charging branch of the input circuit is employed. When the slow charging branch is used the fan is idle.

The arrangement illustrated in Fig. 2 is similar to that shown in Fig. 1 except that the thermostatic switch, designated 37', 38' is normally open, and therefore the relay controlled thereby is necessarily of different construction. This relay comprises a switch 33' which is normally held by the spring 34 in closed position, so that when the current is turned on, charging immediately begins. When the battery reaches the predetermined maximum temperature the thermostat 37', 38' closes, thus energizing relay winding 36, which winding, it will be observed, is connected to the power side of the switch 33'. Energization of the relay winding 36 serves to pull the switch 33 open, thus interrupting charging.

The relay also operates another armature or switch 35' which when closed serves to connect the lower end of winding 36 with the transformer primary by means of a conductor 40. Thus when the thermostat closes and the winding 36 is energized, such energization is maintained by means of the switch 35' and conductor 40. Hence the switch 33' is held open indefinitely, regardless of whether or not the thermostatic switch closes again due to the battery cooling off. This constitutes another type of "lock-out" arrangement. When it is desired to deenergize the relay and restore the parts to normal position it is only necessary to momentarily shift the tap switch 12 out of contact with the taps 13.

In Fig. 3 I have illustrated an arrangement in which both a time controlled switch 9 and a thermally controlled switch 33a are connected in series in the fast charging branch of the input circuit. The time controlled switch is driven by a clock motor 23, one side of which is connected to the power lead 2 and the other side to the branch 4 at a point beyond both the time controlled switch and thermally controlled switch.

Also, as in Fig. 2 the relay winding 36 is connected with the power side of the switch 33a. Thus the thermally controlled switch, when it opens, turns off the clock motor, while the time controlled switch turns off both the clock motor and the relay winding 36. Because of the presence of the time controlled switch, it is not necessary to employ a lock-out in connection with the relay, as in Figs. 1 and 2. When the battery cools off and the thermostat 37, 38 closes the relay winding 36 will be again energized, provided the time controlled switch is still closed.

As in my said prior patent above referred to, I have illustrated in Fig. 3 an arrangement for testing the battery as well as charging it. Such a testing arrangement includes a discharge relay 25, one side of which is connected by wire 26 with the fast charging branch 4 at a point beyond the time controlled switch 9, and the other side of which is connected to a special contact 27 adapted to be engaged by the tap switch 12. The relay 25 controls contacts 28 connected by wires 29 across the battery terminals, one of these wires 29 including a second relay 30. This relay 30 controls contacts 31, one of which is connected to one side of the battery and the other of which is connected through a discharge resistance 32 to the other side of the battery.

When it is desired to test the battery the tap switch 12 is moved out of engagement with the contacts 13 into engagement with the contact 27. Assuming that the time controlled switch 9 is closed, this energizes the relays 25 and 30 and closes contacts 31, thus connecting the discharge resistance 32 across the battery. The time switch limits the duration of such a test and thus prevents the discharge resistance from remaining in circuit for an undesirable period.

In practice the discharge resistance 32 is usually mounted adjacent the rectifier so that both may be cooled by the same fan. In order that the fan motor 24 may run during both charging and testing, it is connected in a manner different from that shown in Fig. 1. In Fig. 3 one side of the fan motor is connected to the selector switch 10, while the other side is connected directly to the power lead 2. This connection has two effects. In the first place, when the selector switch 10 is in engagement with the fast charging branch it assures that the motor will run so long as the time controlled switch is closed, whether this switch is employed to control charging or to control testing. In the second place it causes the fan motor to run when either the fast charging or slow charging branch of the input circuit is used. However, during slow charging the fan will run at lower speed due to the presence of the resistor 8 in the circuit.

In Fig. 4 I have illustrated a modified arrangement in which the selector switch 10' is placed at the power end of the fast and slow charging branches of the input circuit, rather than at the transformer end, as in the previous figures. This selector switch is preferably in the nature of a double pole toggle switch, and in Fig. 4 I have shown a second pole 41 which is mechanically operated in phase with the pole 10'. The pole 41 is connected with the power lead 1 by a conductor 43, and placed between a pair of contacts 42 connected by wire 44 with one side of the fan motor 24, the other side of which is connected to the lower end of the transformer primary. A conductor 11' connects the upper end of the transformer primary with the branches 3 and 4 of the input circuit at a point between the circuit breakers 5 and 6, which, in this modification, are at the transformer end of the branches 3 and 4. The purpose of arranging the pole 41 of the selector switch to swing between the two contacts 42 is to momentarily interrupt the fan circuit as the selector switch 10' is shifted from the fast to the slow charging branch. As in Fig. 3, the fan motor is supplied with current during either fast or slow charging but operates at reduced speed during the latter because of the presence of resistor 8 in the circuit.

Instead of the thermostatic switches shown in Figs. 1, 2 and 3 I have illustrated in Fig. 4 the employment of a thermally variable impedance for controlling the energization of relay 36. This thermally variable impedance is shown as a thermistor 45 insertable into the battery casing and connected by wires 46 to a relay actuating circuit of the Wheatstone bridge type. Such a circuit may be of the kind disclosed in co-pending applications Serial No. 87,494, filed April 14, 1949 in the name of James B. Godshalk and myself, which issued as Patent No. 2,529,038 on November 7, 1950, and Serial No. 97,772, filed by me on June 8, 1949, which issued as Patent No. 2,499,663 on March 7, 1950, or of the type shown in Patent No. 1,694,264 to Hull. As is well known, such actuating circuits can be used either to open a normally closed relay switch or to close a normally open one, upon the attainment of a predetermined temperature by the battery. As shown in Fig. 4, the relay switch 33 is normally open, and is closed by the occurrence of a predetermined temperature. The relay winding 36 is connected by wires 36' with the relay actuating circuit, which circuit derives its power through a wire 48 connected with the branch 4 of the input circuit and a wire 49 connected with taps 50 adapted to be engaged by a tap switch 51 mechanically connected with the tap switch 12.

The purpose of momentarily interrupting the fan motor circuit at the contacts 42, as above described, is to prevent possible feed-back through this circuit to the relay winding 36, which feed-back might result in maintaining the switch 33 closed after the selector switch 10' is thrown into engagement with the slow charging branch 3. If the wire 44 were connected solid to the power lead 1, current could flow through the fan motor, up through the transformer primary and thence through circuit breaker 6 and switch 33 to and through the supply wire 48 connecting with the relay actuating circuit and thence through wire 49 and contacts 50 and 51 to power lead 2. This would energize the relay actuating circuit and serve to maintain the relay winding 36 energized even though the switch 10' is shifted to the slow charging position. By momentarily interrupting the connection at contacts 42, as described, the circuit above traced is momentarily broken so that the switch 33 is released, and opened by the spring 34 as the selector switch is shifted from one position to the other.

In the arrangement of Fig. 4 it is not necessary to provide a lock-out in connection with the relay itself as in Figs. 1 and 2, because the relay actuating circuit 47 incorporates such a lock-out which serves to prevent reenergization of the relay 36 when the battery cools off.

Figure 5:
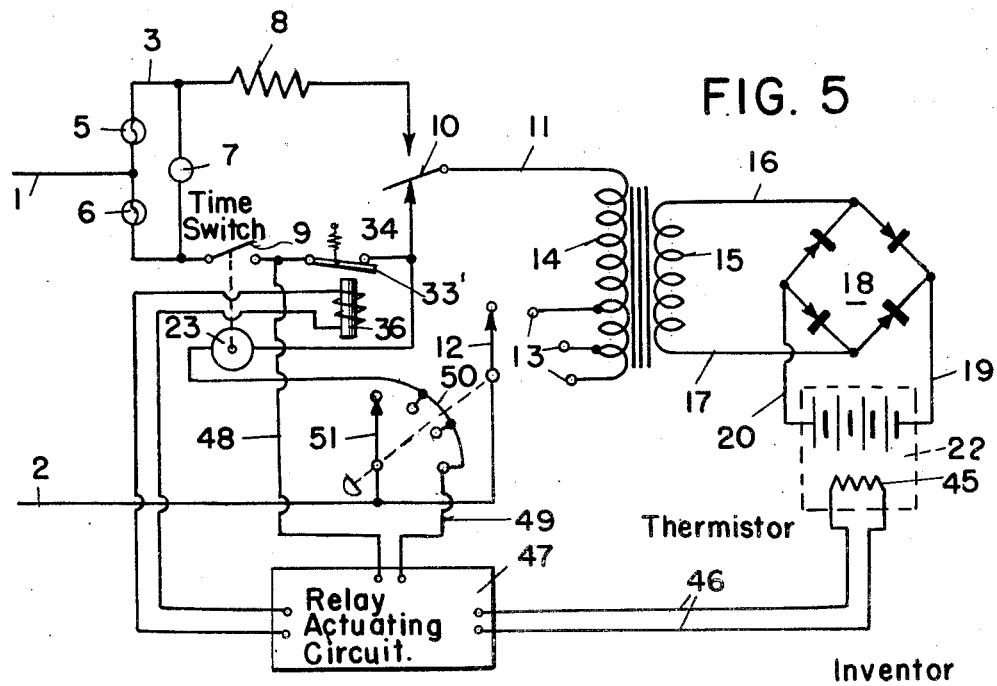
Fig. 5 is a similar diagram illustrating the employment of both a time controlled and thermally controlled switch as in Fig. 3 but showing a slightly different circuit arrangement.

In Fig. 5 I have shown the combination of a time controlled switch and thermally controlled switch used in connection with a relay actuating circuit of the type above discussed.

As distinguished from Fig. 4 in which the relay switch is normally open, I have shown the switch 33' in Fig. 5 as normally closed, the construction being similar to that illustrated in Fig. 2.

In the arrangement of Fig. 5 the clock motor 23 operating the time controlled switch is connected at one side to the fast charging branch 4 at a point beyond both the time controlled switch and thermally controlled switch, as in Fig. 3, and at the other side to the contacts 50 which are adapted to be connected to the power lead 2 by tap switch 51.

Also in Fig. 5 I have shown the supply line 48 for the relay actuating circuit as connected with the input branch 4 at a point beyond the time controlled switch, so that the energization of the relay actuating circuit is governed by the time controlled switch.

Figure 6:
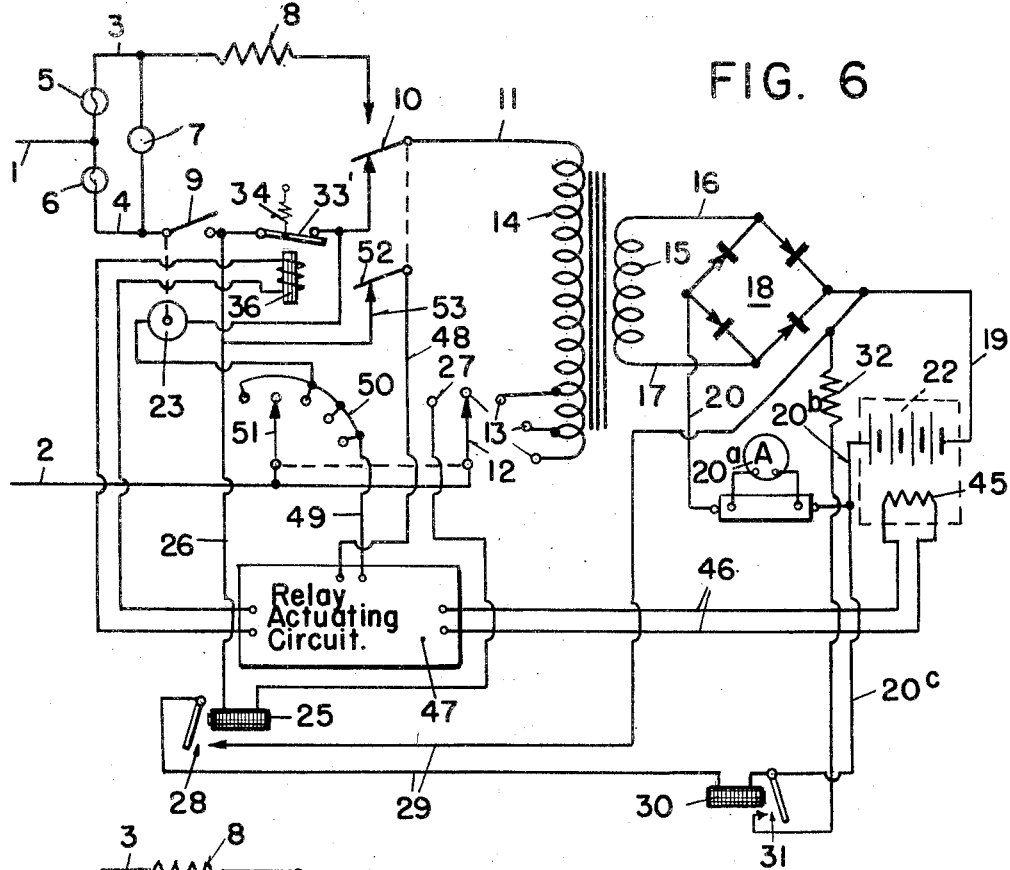
Fig. 6 is a diagram showing an arrangement of switches similar to Fig. 5 but incorporating a battery testing arrangement similar to that of Fig. 3.

In Fig. 6 I have illustrated how the battery testing feature of Fig. 3 can be employed in connection with the relay actuating circuit controlled by the thermistor 45. It would not be possible to employ such a testing circuit with the exact arrangement of Fig. 4, as some modification is necessary. This modification consists primarily in employing a double pole toggle switch, one pole 10 of which serves as the selector switch while the other pole 52 thereof is arranged to control, through wire 53, the supply of current over wire 48 leading to the relay actuating circuit.

If it were not for the switch 52, should the charger be thrown on "slow" charge when there has been some time set into the timing switch, the relay actuating circuit would be needlessly energized for the entire time period, thus tending to shorten the life of the vacuum tube contained therein. With the arrangement shown, however, when the selector switch is shifted to the slow charging position, the supply of current to the relay actuating circuit is interrupted by the switch 52. At the same time the connection to the discharge relay 25 through wire 26 is maintained, and this relay is energized by shifting tap switch 12 into engagement with contact 27. Since the supply to the relay actuating circuit is interrupted at 52, the switch 33' is closed, and the clock motor runs so long as the time controlled switch 9 is closed, thus limiting the duration of the test.

In Fig. 6 the battery is shown as connected with the discharge resistance 32 by means of wires 20b and 20c and contacts 31 of relay 30.

Figure 7:
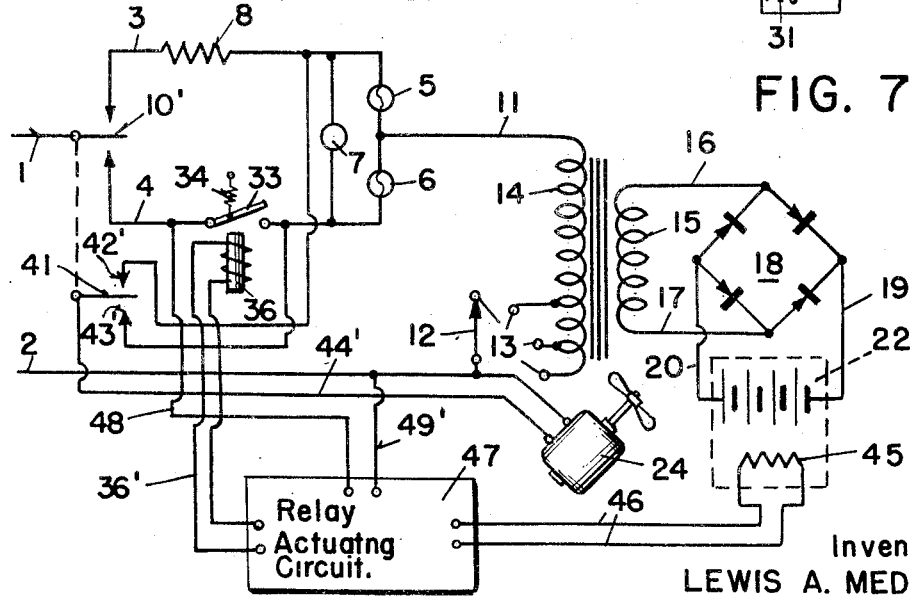
Fig. 7 is a diagram showing the selector switch in the same position as that illustrated in Fig. 4 but incorporating a circuit arrangement whereby the cooling fan is operated continuously regardless of whether or not the circuit breakers are open.

Finally in Fig. 7 I have shown a further modification including a special circuit arrangement for the cooling fan. In this modification a double pole toggle switch is employed, this switch having one pole 10' serving as the selector switch and another pole 41 arranged to swing between a pair of contacts 42' and 43'. This switch is similar to that shown in Fig. 4 except that it is preferably of the three-position type, that is it has an "off" position midway between the two "on" positions. The switch is moved to its "off" position to stop the operation of the charger, instead of manipulating the tap switch.

One side of the fan motor 24 is connected by wire 44' with the pole 41 of the toggle switch and the other side is connected directly to power lead 2. The contacts 42' and 43' are connected respectively with the slow and fast charging branches 3 and 4 of the input circuit, the latter at a point beyond the relay switch 33. Thus when the selector switch 10 is shifted into engagement with either the fast or slow charging branch of the input circuit the switch 41 completes the connection of the fan circuit to the corresponding branch. Thus the fan runs when either branch is employed, but operates at reduced speed when the slow charging branch is used, as above explained.

An important feature of this modification is the fact that the fan circuit is entirely independent of the circuit breakers 5 and 6, so that the fan continues to run regardless of whether or not these circuit breakers are open, thus cooling the rectifier and preventing it from being damaged if the battery is connected in reverse.

In application Serial Number 87,494, now Patent No. 2,529,038, above referred to, the claims are directed to the use of a thermistor in connection with a Wheatstone bridge arrangement and a thermionic tube for actuating a relay controlling the supply of charging current. Some of the claims also include a "lock-out" arrangement.

In application Serial Number 97,772, now Patent No. 2,499,663, above referred to, the claims are directed solely to safety circuits for thermally controlled battery chargers, such circuits including a thermally responsive unit adapted to be inserted in the battery being charged and having a conductive element constructed to contact the battery electrolyte, the arrangement being such that charging current cannot be supplied to the battery unless and until the said conductive element is in contact with the electrolyte.

The present application does not disclose the safety feature covered by Serial Number 97,722, above described and, while in Figs. 4, 5, 6 and 7, there is indicated the use of a relay actuating circuit of the general nature shown in Serial Number 87,494, the present claims are restricted to an arrangement in which the charging circuit comprises fast and slow branches, and a selector switch by means of which either branch desired may be employed.

What I claim is:

1. A battery charger comprising a transformer having primary and secondary windings, a pair of power leads, means including a manually operated switch, shiftable to either one of two positions, for connecting said leads to said primary winding so as to selectively provide either a relatively high resistance or a relatively low resistance input circuit, as desired, a thermally-controlled switch, responsive to the temperature of the battery being charged, in said low resistance circuit only, means for supplying rectified current from the secondary of said transformer to the battery to be charged, a fan motor, means for supplying said motor with current when either said high resistance or said low resistance input circuit is being utilized, and means for momentarily interrupting the circuit of said fan motor whenever said manually operated switch is shifted from one position to the other.

2. A battery charger comprising a transformer having primary and secondary windings, a pair of power leads, means including a manually operated switch, shiftable to either one of two positions, for connecting said leads to said primary winding so as to selectively provide either a relatively high resistance or a relatively low resistance input circuit, as desired, a thermally-controlled switch, responsive to the temperature of the battery being charged, in said low resistance circuit only, means for supplying rectified current from the secondary of said transformer to the battery to be charged, a fan motor, means for supplying said motor with current at one voltage when said low resistance input circuit is employed, and at a lesser voltage when said high resistance circuit is employed, whereby, in the latter case, said motor operates at reduced speed.

3. A battery charger comprising a transformer having primary and secondary windings, a pair of power leads, means for connecting said leads to said primary winding so as to provide either a relatively high resistance or a relatively low resistance input circuit, as desired, a rectifier connected with said secondary winding, an automatic circuit breaker in each input circuit, a motor driven fan for cooling said rectifier, and connections for supplying current to said fan motor, independently of said circuit breakers, when either said high resistance or low resistance circuit is employed.

LEWIS A. MEDLAR.

References Cited in the file of this patent

UNITED STATES PATENTS

| Number | Name | Date |
|---|---|---|
| 913,105 | Conant | Feb. 23, 1909 |
| 996,372 | Steinmetz | June 27, 1911 |
| 1,368,482 | Carrier | Feb. 15, 1921 |
| 1,433,078 | Hulss | Oct. 24, 1922 |
| 1,634,941 | Hewlett et al. | July 5, 1927 |
| 1,694,264 | Hull | Dec. 4, 1928 |
| 1,837,738 | Vencill | Dec. 22, 1931 |
| 1,852,799 | Cheeseman | Apr. 5, 1932 |
| 1,959,513 | Weyandt | May 22, 1934 |
| 2,037,062 | Brach | Apr. 14, 1936 |
| 2,112,093 | Harty | Mar. 22, 1938 |
| 2,354,877 | Peters | Aug. 1, 1944 |
| 2,355,488 | Van Vulpen et al. | Aug. 8, 1944 |
| 2,366,505 | Fletcher | Jan. 2, 1945 |
| 2,402,695 | Taylor et al. | June 25, 1946 |
| 2,413,865 | Dalzell | Jan. 7, 1947 |
| 2,431,794 | Dichter | Dec. 2, 1947 |
| 2,432,069 | Pugh | Dec. 2, 1947 |
| 2,436,057 | Pugh | Feb. 17, 1948 |
| 2,456,978 | Medlar | Dec. 21, 1948 |
| 2,499,663 | Medlar | Mar. 7, 1950 |
| 2,502,729 | Klinkhamer | Apr. 4, 1950 |
| 2,571,048 | Medlar | Oct. 9, 1951 |

FOREIGN PATENTS

| Number | Country | Date |
|---|---|---|
| 378,516 | Great Britain | Aug. 15, 1932 |